United States Patent [19]
Foisy et al.

[11] Patent Number: 5,877,919
[45] Date of Patent: Mar. 2, 1999

[54] METHOD AND APPARATUS FOR A LOW-PROFILE HEAD-SUSPENSION ATTACHMENT FOR A DISK DRIVE

[75] Inventors: Gregory Gerard Foisy, Tracy; Thaddeus Anthony Raczek, San Jose, both of Calif.

[73] Assignee: Western Digital Corporation, Irvine, Calif.

[21] Appl. No.: 660,351

[22] Filed: Jun. 7, 1996

[51] Int. Cl.⁶ .............................. G11B 5/55; G11B 21/08
[52] U.S. Cl. ............................................................ 360/104
[58] Field of Search ................................... 360/104, 106; 29/603.03

[56] References Cited

U.S. PATENT DOCUMENTS

| | | | |
|---|---|---|---|
| 4,686,592 | 8/1987 | Carroll et al. | 360/97 |
| 4,707,754 | 11/1987 | Patel et al. | 360/106 |
| 4,764,831 | 8/1988 | Patel | 360/105 |
| 4,796,122 | 1/1989 | Levy et al. | 360/98.01 |
| 4,829,395 | 5/1989 | Coon et al. | 360/104 |
| 4,853,811 | 8/1989 | Brooks, Jr. et al. | 360/103 |
| 4,943,875 | 7/1990 | Reidenbach et al. | 360/104 |
| 5,063,464 | 11/1991 | Astheimer et al. | 360/104 |
| 5,081,553 | 1/1992 | Wanless et al. | 360/103 |
| 5,124,865 | 6/1992 | Atesmen et al. | 360/103 |
| 5,377,060 | 12/1994 | Nigam | 360/99.01 |
| 5,391,842 | 2/1995 | Bennin et al. | 174/260 |
| 5,404,636 | 4/1995 | Stefansky et al. | 29/603 |
| 5,461,524 | 10/1995 | Jurgenson | 360/104 |
| 5,461,525 | 10/1995 | Christianson et al. | 360/104 |
| 5,491,597 | 2/1996 | Bennin et al. | 360/104 |
| 5,650,894 | 7/1997 | Ikeda | 360/104 |
| 5,691,581 | 11/1997 | Umehara et al. | |

*Primary Examiner*—Robert S. Tupper
*Attorney, Agent, or Firm*—Leo J. Young; W. Chris Kim

[57] ABSTRACT

Apparatus and means for attaching the head-suspension assembly to the actuator arm in a disk drive. A head-suspension assembly in a first fabrication step is permanently fastened to a nut plate, for example, by laser welding. The nut plate is fastened to the suspension assembly on the suspension surface that faces away from the nearby recording disk when the disk drive is fully assembled. Another aspect of this invention is the use of heat-activated thermosetting adhesive. The head-suspension assembly with the affixed nut plate is fastened to an actuator arm with a heat-activated adhesive film. In one embodiment, the adhesive is applied to both sides of a thin plastic film for ease of handling and application. In another embodiment, the adhesive is made electrically conductive to provide an electrically-conductive path between the actuator arm and the head-suspension assembly. In one such embodiment, the plastic film separating the two layers of electrically-conductive adhesive is perforated to allow contact between the two layers of adhesive that forms an electrically-conductive path.

16 Claims, 7 Drawing Sheets

| Peak Offtrack During Z-axis Vibration Over Operating Range Adhesive Attach vs. Swaged Suspension | | | | | | |
|---|---|---|---|---|---|---|
| | | | Vibration Frequency Range (Hz) | | | |
| | Head | HDA | 101-150 | 151-200 | 201-250 | 251-300 |
| Percent Offtrack | 0 | A11 | 4.42 | 5.18 | | |
| | | A16 | 3.66 | 4.31 | | |
| | | A17 | 3.45 | 4.38 | | |
| | | S1 | 6.90 | 5.63 | | 11.21 |
| | | S3 | 5.15 | 4.94 | | |
| | | S6 | 4.78 | 10.33 | 5.15 | |
| | 1 | A11 | 4.52 | 4.97 | | |
| | | A16 | 4.21 | 4.52 | | |
| | | A17 | 4.31 | 4.91 | | |
| | | S1 | 5.92 | 5.03 | | 11.02 |
| | | S3 | 6.00 | 4.94 | | |
| | | S6 | 5.61 | 11.18 | | 9.23 |
| | 2 | A11 | 3.83 | 4.72 | | |
| | | A16 | 3.79 | 4.42 | | |
| | | A17 | 4.52 | 4.72 | | |
| | | S1 | 6.83 | 5.27 | | 11.43 |
| | | S3 | 9.77 | 5.71 | | |
| | | S6 | 12.93 | 12.34 | | 7.65 |
| | 3 | A11 | 4.69 | 4.72 | | |
| | | A16 | 3.66 | 4.02 | | |
| | | A17 | 3.83 | 4.62 | | |
| | | S1 | 6.79 | 5.24 | | 11.12 |
| | | S3 | 6.25 | 5.12 | | |
| | | S6 | 5.95 | 23.13 | | 9.87 |
| | Ave. Adhesive | | 4.07 | 4.62 | | |
| | St. dev. Adhesive | | 0.42 | 0.32 | | |
| | Ave. Swage | | 6.91 | 8.24 | 5.15 | 10.22 |
| | St. dev. Swage | | 2.27 | 5.43 | | |
| | Percent Reduction with Adhesive | | 41.02 | 43.87 | | |
| Note: SX = Swaged Head-Disk Assemblies (i.e., S1, S3, S6) AXX = Adhesive-Fastened Head-Disk Assemblies (i.e., A11, A16, A17) | | | | | | |

FIG. 8

METHOD AND APPARATUS FOR A LOW-PROFILE HEAD-SUSPENSION ATTACHMENT FOR A DISK DRIVE

BACKGROUND OF THE INVENTION

1. Field of the Invention

This invention relates to the field of disk drives, and more specifically to a method and apparatus for fastening a head-suspension assembly to a rigid actuator arm for a hard disk drive.

2. Description of the Related Art

The data storage capacity of a hard disk drive is determined by its volumetric recording bit density, i.e., the number of recording bits per unit volume that the disk drive can use. Using one or more recording disks in a hard disk drive, the total available bit storage capacity in a hard disk drive is a function of the following parameters: the number of recording bits per recording track on a surface of a recording disk, the number of recording tracks on the surface of the recording disk, the number of recording surfaces for each recording disk, and the number of recording disks contained in the hard disk drive. To increase the data storage capacity of a hard disk drive, one may increase any or all of the above parameters. There is, accordingly, a clearly felt need to more effectively use the space within a disk-drive enclosure as well as a need to increase the durability of the drive through increased shock protection. More efficient use of space can increase the number of recording disks within the hard disk drive (which greatly increases the amount of data that can be stored) and/or provide additional space for other internal components.

A head-suspension assembly for a disk drive typically includes a magnetic transducer, called the read/write head, capable of detecting and/or changing the magnetic transitions on the magnetic recording surface of a magnetic recording disk. The read/write head is typically fixed to a gimbal assembly that enables the read/write head to fly above, or be in full or partial contact with, a moving magnetic recording surface. The gimbal assembly is fastened to a load beam, and may be formed out of load beam material. The load beam is typically made of thin, somewhat flexible material, usually metal. The head-suspension assembly is typically fastened to an actuator arm. The actuator arm is moved by the control electronics of the disk drive to position the read/write head over different portions (tracks) of the magnetic recording surface. Moving the read/write head from one track on the magnetic recording surface to another track on the same magnetic recording surface, so that the read/write head can read the data on the new track requires a time interval called access time. Another factor affecting drive performance is rotational latency time, which is the time it takes the disk to rotate from the present location on the desired track to the location of the desired data on the same track.

One constraint on developers of hard disk drives is the "form factor" (the defined physical dimensions) imposed on a hard disk drive to be competitive within the market-place. In particular, each form factor defines a height that drives must match so that the drive fits correctly into standard openings in devices using the drives, such as personal computers and other electronic devices. Increasing the number of magnetic recording disks within a given form factor reduces the spacing between adjacent magnetic recording disks. The actuator arms and associated suspensions and magnetic read/write heads operate within the space between adjacent disks, and on the outfacing surfaces above and below the "top" and "bottom" disks respectively. The assembly and operation of the read/write heads is more difficult because the reduction of the space for the read/write head-suspensions places the head-suspension materials in close proximity to the moving disk surface.

Figure 1:
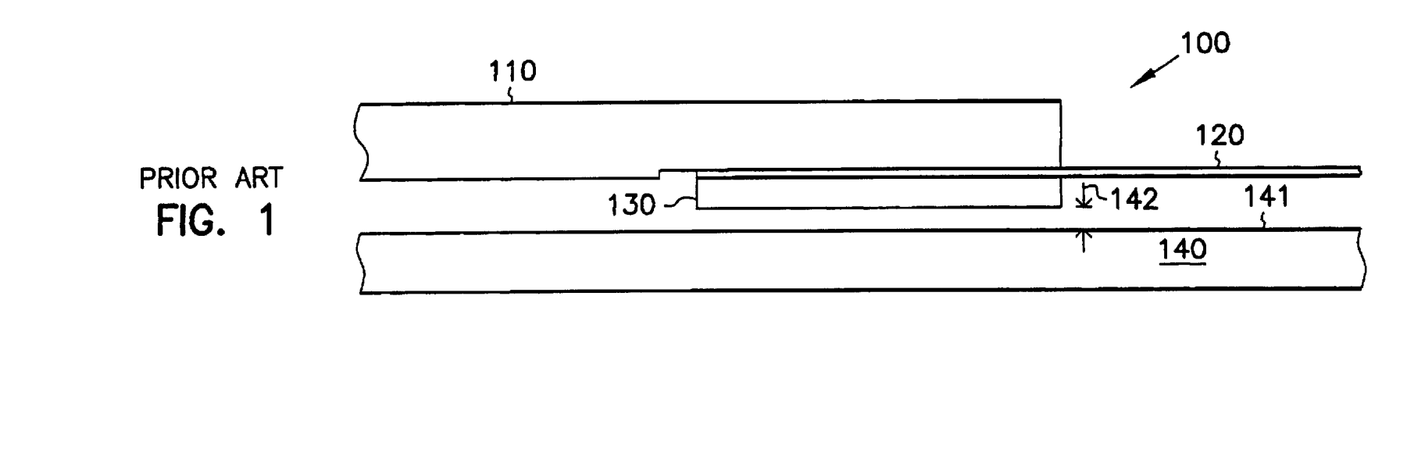
FIG. 1 is a prior-art side view of a typical attachment of the head-suspension to the actuator arm using a nut plate.
Figure 2:
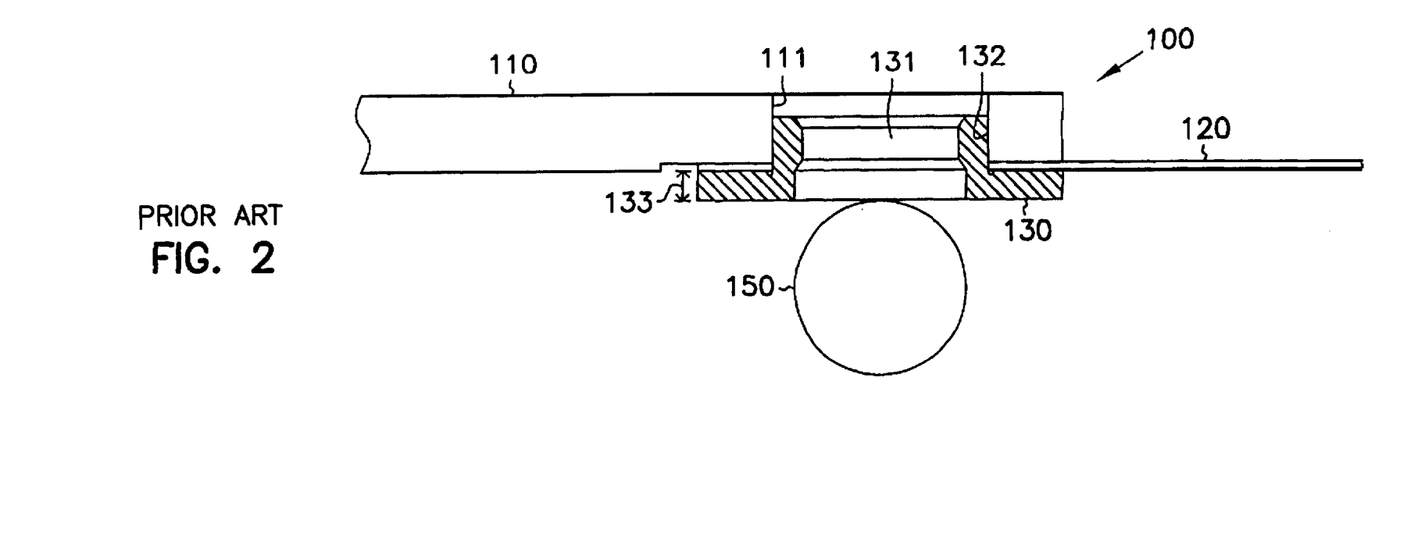
FIG. 2 is a prior-art side view showing the typical swaging process attaching a head-suspension to an actuator arm.

The typical read/write head-suspension assembly includes a load beam that is welded to a nut plate. The nut plate provides a stiff weldment for the suspension and the means for attaching the suspension to the disk-drive actuator arm. One commonly used method for attaching the headsuspension assembly (also called the "Head-Gimbal Assembly" (HGA), particularly when a gimbal is included for the head assembly) to the disk drive actuator arm is by swaging. In the swaging process, a spherical swage ball is passed through a tube that provides the attachment feature of the nut plate. The material of the nut plate tube (also called the "ferrule" or "boss" of the nut plate) and the actuator arm is displaced to accommodate the swage ball being forced through the nut plate tube (the diameter of the swage ball is larger than the original inner diameter of the nut plate tube). It is important that the flange portion of the nut plate remain flat and stable during the swaging process so that the suspension performance is not compromised by undesirable deformations of the nut plate. Therefore, the nut plate flange has typically been manufactured so that the nut plate flange provides a stiff mounting for the suspension. This stiffness is provided by providing a relatively thick nut plate flange, typically three (3) to four (4) times the thickness of the suspension material. Prior-art FIG. 1 is a side view of the portion of a head-arm assembly 100 showing the head-suspension material 120 fastened between a nut plate 130 and an actuator arm 110. Portions of the complete actuator arm 110 and complete head-suspension 120 are not shown to simplify the drawing, but are well known to those skilled in the art. The attachment method is typically the conventional swaging process exemplified in FIG. 2. The swaging process necessitates a relatively thick nut plate flange 133, that reduces the nut plate-to-disk clearance 142 (shown in FIG. 1) to undesirably low values. FIG. 2 shows the nut plate slipped into a swaging hole 111 in arm 110 and shows the swage ball 150 immediately before it is forced through the nut plate tube 131. The interference fit of the swage ball 150 with the nut plate tube 131 forces the material of the nut plate tube 131 radially outward into the actuator arm 110, fixing the nut plate 130 solidly to the actuator arm 110 at surface 132.

The present practice is to place the nut plate flange material on the side of the suspension material that is closest to the disk surface. By doing so, the clearance to the disk surface is reduced still further. This is not desired because it requires tight tolerance control to assure no contact between the nut plate flange and the disk surface during the head merge operation wherein the actuator components are first introduced to the disk stack at manufacture, and later during operation of the disk drive. Tight tolerances require more intricate tooling and fixtures, as well as increased piece part cost. It is also important to avoid contact between the nut plate and suspension components and the disk surface during shock loading, both during disk operation and otherwise. Shock-induced contact may cause the localized loss of data at the location where a head, load beam, nut plate, or actuator arm hits the disk surface, or catastrophic failure of the drive in the form of a head crash.

Others have approached the shock-event situation a bit differently in the portable market. Some actually drive the actuator clear off of the disk 140 when parking the heads for shutdown. If the arms and suspensions are not over the disk, then they do not have to worry about disk-to-head or disk-to-suspension contacts during non-operational shock events. This approach has several significant disadvantages:

(1) A ramp tower is needed to keep the suspensions spaced apart when they are unloaded from the disk;
(2) It requires more space in the drive: the ramp tower space as well as the additional rotation angle space for the actuator to unload the heads;
(3) It uses energy to park and unpark the heads from the tower;
(4) Loading and unloading heads can introduce instability in the flight of the heads, leading to greater risk of drive failure; and
(5) Operational shock protection is not improved by this strategy.

Another approach is to thin the nutplate material. One embodiment initially used this approach by reducing the nutplate thickness to 0.0098" (0.25 mm) from 0.0118" (0.30 mm). This only gains 0.002" (0.05 mm). Suspension suppliers and head stack suppliers are reluctant to thin the nutplate further, because of concern for warpage of the nutplate during the standard swage-attaching operation. This warpage results when the swage ball is forced through the ferrule (or boss) on the nutplate. Swaging is a harsh event. Nutplate stiffness limits warpage only if the nutplate is thick enough. Practitioners believe that the 0.0098" (0.25 mm) is minimal but that substantial warpage would likely result with thinner nut plates. Warpage is a problem because it affects the bend area of the suspension. This area is carefully designed to achieve acceptable resonance characteristics and to achieve adequate loading of the slider against the disk. This loading (called the "gram load") must be well controlled to achieve consistent flight behavior of the slider of head suspension 320.

Adhesive fastening is believed to have been used on the suspension-to-load beam or flexureto-actuator arm assembly by Maxtor Corporation on a 5 ¼-inch (133 mm) drive, 8 disks, about a 640–800 MB drive made about 1988–89. The adhesive used was a two-part adhesive, where one side of one piece is coated with adhesive Part A, and the facing surface of the other piece is coated with adhesive Part B. When the two adhesive parts come in contact, they cure in a chemical reaction at room temperature (RT). To set the adhesive, the two pieces are placed in a tool that holds them in contact until the adhesive sets (about 30 minutes at RT). The type of adhesives used by Maxtor Corporation are now considered too unstable for use at the upper operating temperatures of modern disk drives, are also considered as having unacceptable out-gassing for modern disk drives, and also are not stable enough for applications in modern very small drives designed for extremely long lifetimes.

Another problem known in the art of fastening the head-suspension assembly to the actuator arm arises from vibrations. Consider that vibrations are passed from the actuator arm to the head-suspension assembly. The rigid metal-to-metal connection, for example, between the swaged nut-plate tube and the actuator arm, apparently passes vibrations from the actuator arm to the head, which then occasionally introduces head-tracking errors.

Another problem known in the art is the impracticality in reworking the actuator arm-suspension assembly when a problem is detected. Removing the head-suspension assembly from the actuator arm without damage to either the head-suspension assembly or the actuator arm is extremely difficult. Presently, removing a head-suspension assembly from an actuator arm damages the head-suspension, rendering it useless.

Other problems known in the art are the relatively long time needed to assemble the slider/head-to-suspension assembly, and the impracticality in reworking when a problem is detected. Currently the slider suspension and read/write head assembly (together often just called the "head") is bonded to the suspension with an electrically-conductive adhesive, such as a silver-filled two-part epoxy adhesive, and an anaerobic, UV and heat-curing adhesive, such as Loctite 366. The 366 adhesive is used as the fast-bonding material to hold the head and suspension in position, while the filled-epoxy adhesive requires longer heat-cure time to react. The process requires depositing small drops of each adhesive component, followed by UV and heat-cure cycles. A typical process would include a fast-UV cure to tack the assembly, followed by a heat-cure tunnel oven to react the conductive epoxy adhesive. This is a time-consuming process. In addition, if a problem is detected, removing a head from a suspension damages one or both, rendering them useless.

U.S. Pat. No. 4,943,875 and U.S. Pat. No. 4,853,811 disclose methods and means for attaching the head-suspension assembly to the actuator arm through the use of screws or welds. U.S. Pat. No. 4,943,875 disclose the use of a mounting band that encircles the end of the actuator arm and is secured thereto by one of a variety of means, including spring loading, adhesive, solder, or deformable metallic means.

SUMMARY OF THE INVENTION

This invention provides a means for attaching a head-suspension assembly to an actuator arm that offers improved clearances in data-storage disk drives having closely spaced disks. In one embodiment, a head-suspension assembly is permanently fastened to a nut plate using attachment methods known to those skilled in the art, such as laser welding. The head-suspension assembly and nut plate combination is in turn fastened to an actuator arm by an adhesive film so that the nut plate is fastened to the suspension assembly on the surface of the suspension opposite that facing the surface of a data-storage disk. In another embodiment, the adhesive film is non-liquid when applied. The suspension material thus becomes closer to the data storage disk than any other part of the arm-to-suspension attachment.

This method of attachment with an adhesive film for the first time allows a reduction of the nut plate thickness below that needed by swaging methods, or, alternatively, elimination of the nut plate altogether. The reduction in nut-plate thickness (or its elimination) allows the head-suspension assembly to be used in stacks of recording disks that have reduced spacing between disks, allowing more disks and hence more data storage to be fit in a given form factor. Additionally, the smaller nut plate reduces the overall weight (and inertia) of the head arm assembly, which allows the head arm assembly to be moved faster, providing quicker access to data, and/or with less energy, conserving power. Conserving battery power is very important in portable battery-powered disk drive such as those designed for laptop computers.

Another aspect of this invention is the introduction for the first time of heat-activated thermosetting adhesive for head-suspension assemblies, and in particular, an adhesive film that is non-liquid when applied. In one such embodiment, the adhesive (for example, 0.0008" (0.02 mm) thick, each side) is applied to both sides of a thin (for example, 0.0010" (0.025 mm) thick) plastic film to aid in handling and application. (A thin adhesive film without the plastic layer just described can be quite difficult to handle, even with tweezers.) In one such embodiment without the plastic film (or with an electrically-conductive plastic film), the adhesive is electrically conductive and provides an electrically-conductive path between the actuator arm and the head suspension assembly. In another embodiment, the plastic film separating the two layers of electrically-conductive adhesive is perforated with holes, allowing the two layers of conductive adhesive to contact one another, forming an electrically-conductive path from the suspension to the actuator arm.

DETAILED DESCRIPTION OF PREFERRED EMBODIMENTS

In the following detailed description of the preferred embodiments, reference is made to the accompanying drawings that form a part hereof, and in which are shown by way of illustration specific embodiments in which this invention may be practiced. It is understood that other embodiments may be used and structural changes may be made without departing from the scope of the claimed invention.

Figure 3A:
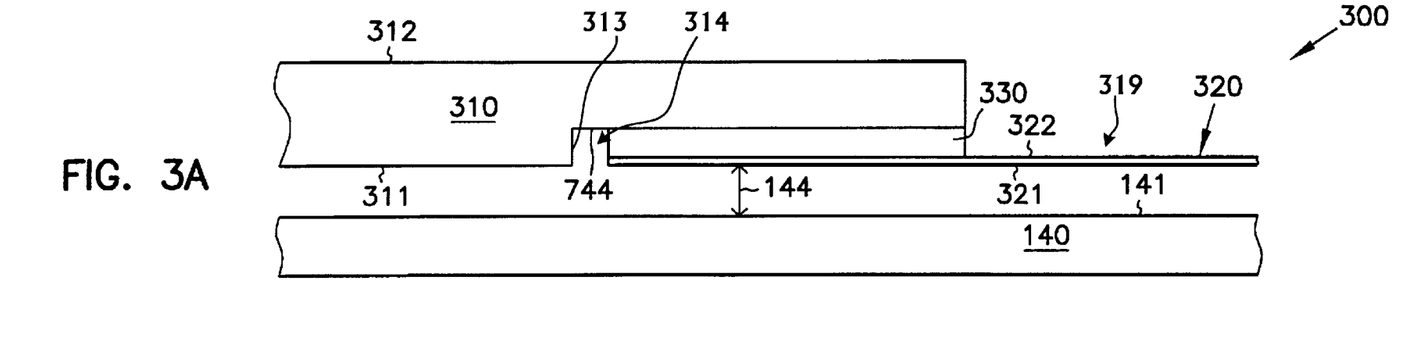
FIG. 3A is a side view showing a head-suspension attached to an actuator arm with a nut plate on the side of the suspension material furthermost from the magnetic recording disk.

FIG. 3A shows one embodiment of this invention as a head-arm assembly 300 ("head stack assembly"—only a portion of which is shown) having a head-suspension assembly 319 which includes head suspension 320 (that has a surface 321 facing towards disk 140 and a surface 322 facing away) coupled to an actuator arm 310 using nut plate 330 between the head-suspension 320 and the actuator arm 310. The means of fastening the nut plate 330 to the actuator arm assembly 310 are not shown, but could include techniques such as swaging, welding, gluing, or screwing. The embodiment shown in FIG. 3A has moved nut plate 330 further from surface 141 of the magnetic recording disk 140. In the embodiment shown in FIG. 3A, the surface 321 of suspension 320 is substantially co-planar with the lower surface 311 ("first surface") of arm 310, and a connection surface 744 ("third surface") of arm 310 is recessed from surface 311 by an amount equal to the thickness of nutplate 330 plus the thickness of suspension 320, plus any other applicable tolerances, to obtain co-planarity. In one embodiment, the reversed nutplate position (see FIG. 3A compared to FIG. 1) gains 0.012" (0.30 mm) additional clearance. Arm 310 further includes a second surface 313. Second surface 313 and third surface 744 define a recess 314.

Figure 3B:
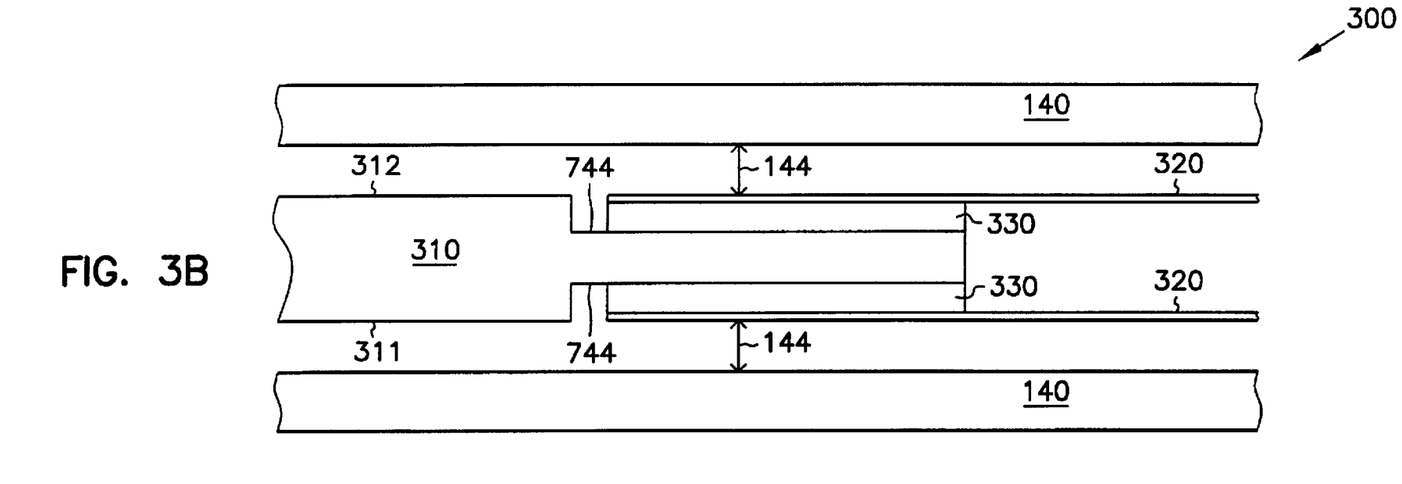
FIG. 3B is a side view showing two head-suspensions attached, one to either side, to an actuator arm with nut plates on the side of the suspension material furthermost from the magnetic recording disk.

In another embodiment of head-arm assembly 300, shown in FIG. 3B, the end of actuator arm 310 has two opposing recessed surfaces 744, so that one suspension 320 may be attached substantially co-planar to bottom surface 311 of arm 310, and another suspension 320 may be attached substantially co-planar to top surface 312 of arm 310. Such an arrangement is used between two disks 140.

This invention is preferably used in magnetic hard-disk recording drives. However, this invention is not limited to hard disk drives, and also finds use in a variety of recording devices, such as a floppy-disk drive having flexible magnetic media, and optical and CDROM (e.g., writable Compact Disk Read-Only Memory) drives.

Figure 4A:
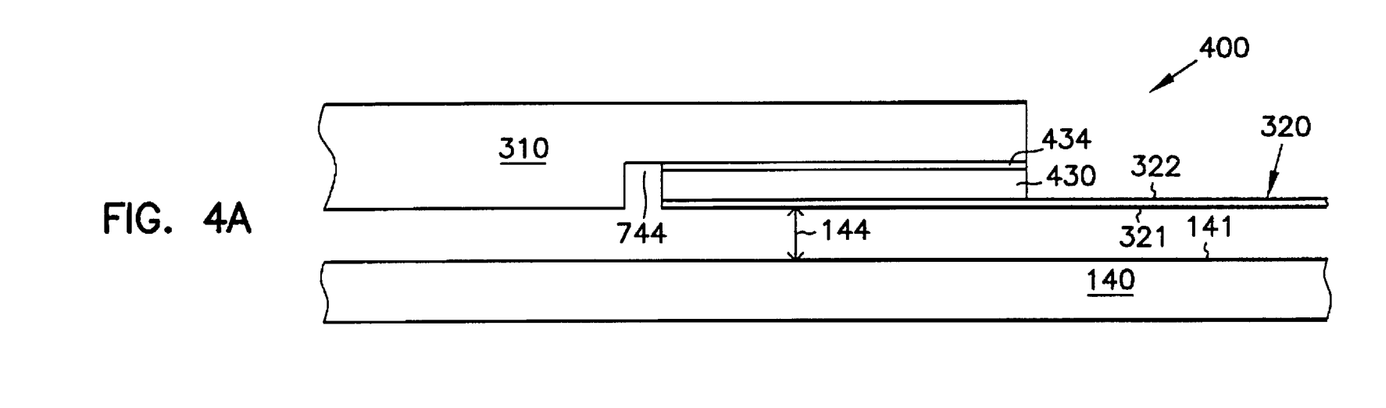
FIG. 4A is a side view of a head-suspension attached to an actuator arm using a thinned nut plate and an adhesive film.

FIG. 4A is a representation of one embodiment of this invention indicated generally at connection 400 showing a low-profile nut plate 430, having reduced thickness, attaching a head-suspension 320 to an actuator arm 310 with an adhesive film 434. The suspension-to-disk clearance 144 has been increased compared to the nut plate-to-disk clearance 142 of FIG. 1. While the invention is not to be limited thereto, in one embodiment, the adhesive film 434 used is Brady L1656-54 Double-Side Thermoset Adhesive, manufactured by W. H. Brady Company of Milwaukee, Wis., 53201. In another embodiment, Brady type L1766-80 thermoset adhesive film is used. Attached Appendix A lists some of the properties of the Brady L1656-54 and the similar Brady L1766-80 adhesives. In these embodiments, the adhesive film 434 is a thermosetting synthetic-rubber heat-seal adhesive variety that develops hot tack strength after being heated to at least approximately 120° C. for a predetermined time interval (in one embodiment, less than one minute), and then continues to cure with application of additional heat. In one embodiment, the preferred values of applied pressure, temperature, and heat-application-time interval for attaching the suspension 320 to the arm 310 with the heat-activated adhesive are empirically derived. Thermosetting adhesive film 434 is used to facilitate the manufacturing process of assembling (or removing, for rework purposes) the head-suspension assembly 320 to or from the actuator arm assembly 310.

In one embodiment of this invention, the heat-activated adhesive film preferentially adheres to one surface more than another based on the relative time, temperature, and/or pressure applied during adhesive activation. In one such embodiment, a circular ring of adhesive film 434 is sandwiched between a release layer and the suspension 320 with pressure and heat. The circular ring shape of adhesive film 434 in this embodiment provides both a symmetric shape that helps to avoid misalignment problems that can arise if other shapes are used, and the hole in the center provides a feature that can be aligned or fitted over a corresponding feature of the part being adhered, in this case suspension 320 to ensure accurate placement of the adhesive. In one embodiment, formed conductivity fingers of suspension 320 extend through the hole in the circular ring of adhesive film 434, to electrically contact actuator arm 310 when assembled, the surrounding circular ring of adhesive film 434 providing even force on the fingers to maintain this contact. The release layer is then removed from its surface of adhesive film 434, and that surface is placed on actuator arm 310 with additional heat and pressure applied. The total heat and pressure activation on the suspension 320 surface exceeds that for the actuator arm side, providing preferential adhesion to the suspension 320. In another embodiment, the preferential adhesion is based on a temperature differential between the surfaces as they are bonded or separated. In yet another embodiment, the preferential adhesion is based on a difference in adhesive-layer characteristics on one face (i.e., on one side) of the adhesive film relative to that of the other face. In yet another embodiment, the surface energies and/or surface roughness of the materials to be bonded (i.e., the suspension and the actuator arm, respectively) are chosen to achieve preferential adhesion.

The inventors have demonstrated that the use of the head-arm assembly 400 enhances the performance and/or error-resistance of the disk drive and believe that this performance improvement arises, at least in part, from a vibration-damping effect of the synthetic-rubber adhesive that is better than that which can be achieved with direct metal-to-metal fastening. The effect dampens vibrations of the head-arm assembly 400, thereby reducing the number of off-track read errors.

Another benefit of the adhesive fastening system of this invention is the prevention of cracking in the arm 310 that occasionally occurs when swaging a suspension 320 to an arm 310 that is very thin or narrow, or an arm 310 that is made, at least in part, of plastic. By using the adhesive fastening method of this invention, thinner arms 310, narrower arms 310, and/or arms 310 made of plastic (or partially of plastic) can be used without cracking problems. In contrast, a swaging process, even when using a jig to keep the arm 310 in place, distorts or deforms the arm 310 and/or the suspension 320 as a result of the vertical force applied by the swaging ball. In contrast, the adhesive fastening process of this invention can be accomplished with little vertical force applied to the arm 310 (and with negligible shear or cantilevered force), and thus negligible vertical deformation of the arm 310 and of the suspension 320, giving much less variation in the gram load provided by the suspension 320 to the head (the spring force provided by the suspension urging the head towards the disk is called the "gram load").

Figures 7A, 7B, 7C, 7D, 7E:
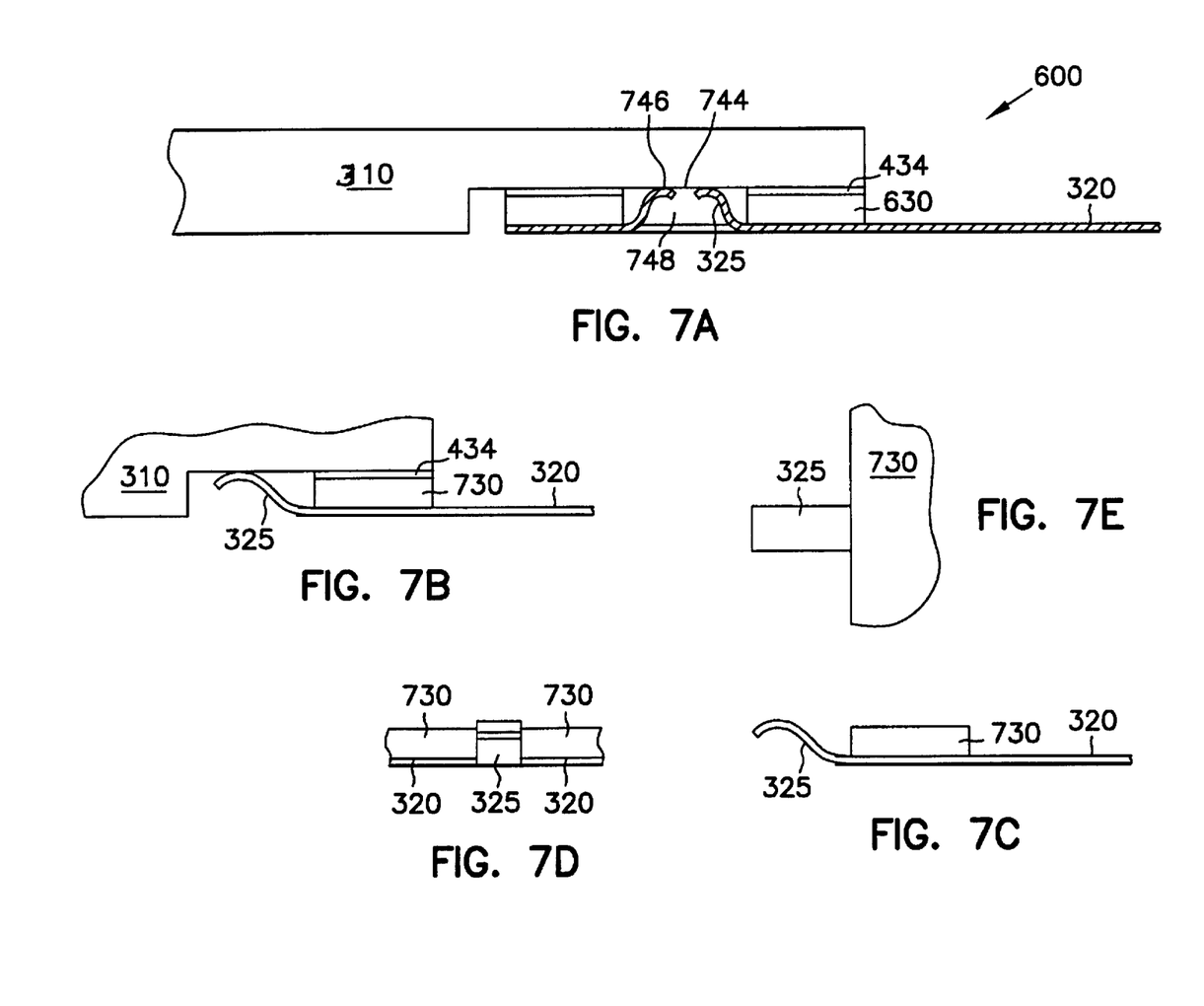
FIG. 7A is a side view showing a grounding means of a head-suspension 320 attached to an actuator arm 310 using a nut plate 630 and grounding tabs formed in the head-suspension material.
FIG. 7B is a side view, assembled, showing a grounding means of a head-suspension 320 attached to an actuator arm 310 using a nut plate 730 and grounding tabs formed in the head-suspension material at an outer edge of the nutplate 730.
FIG. 7C is a side view, before assembly, showing a grounding tab 325 of a head-suspension 320 as in FIG. 7B.
FIG. 7D is an end view, before assembly, showing a grounding tab 325 of a head-suspension 320 as in FIG. 7B.
FIG. 7E is a top view, before assembly, showing a grounding tab 325 of a head-suspension 320 as in FIG. 7B.

In another embodiment of this invention, the head-suspension assembly 320 is fastened directly to the actuator arm 310 with the adhesive file 434, and without nut plate 430, as shown in FIGS. 7B and 7C.

By placing the nutplate between the suspension 320 and the arm 310, or by eliminating the nutplate altogether, the clearance to the disk is increased in the area of the arm-to-suspension connection. This improves the "shock performance" of the drive, since the increased clearance in this area provides better resistance to shock, both when the drive is operating and when the heads are parked. This is particularly important for very small drives and drives with close disk-to-arm spacing.

The head-suspension assembly and the actuator arm 310 are typically at a zero (0) voltage potential, i.e., ground potential. This reduces the buildup of static electricity and provides electrical shielding for the weak electrical signals from the read/write head.

Figure 4B:
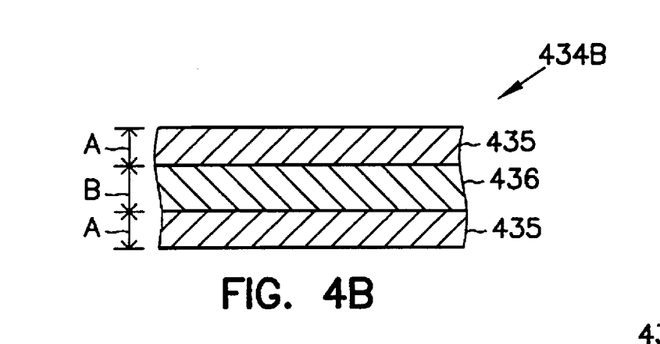
FIG. 4B is an enlarged cross-section view of an adhesive film 434.

In one embodiment, shown in FIG. 4B, the adhesive 434 is a thermosetting dry film 435 applied to both sides of a thin plastic polyamide film 436, a combination that aids in handling and applying the adhesive to the head-suspension assembly 320 and actuator arm 310. It also permits control of the thickness of adhesive, makes for easy die-cutting of the film 434 to a size and shape matching the interface between the arm 310 and suspension 320, and permits easy locating and positioning. The thermosetting characteristic provides good hot-bond strength, since reheating after the initial heat cycle used to fasten the suspension 320 to the arm 310 does not significantly re-soften the set adhesive. In contrast, a thermoplastic adhesive film does not offer the necessary physical stability over the requisite wide temperature range.

In one embodiment of the invention, the interface between the head-suspension assembly 320 and the actuator arm 310 is electrically conductive by using electrically-conductive adhesive film 434. In one such embodiment, the plastic film is perforated so that the two layers of conductive adhesive are in contact with one another through the perforations, making an electrically-conductive path between them, while retaining the desired handling characteristics of the film. The thin plastic film sandwiched between two layers of dry adhesive film offers much better handling characteristics than is obtained by the adhesive film alone.

In one embodiment, the electrically-conductive adhesive film 434 must be suitable for minimizing out-gassing. In one test for out-gassing, as tested by commercially available thermal gravimetric systems, a sample is loaded onto a microbalance pan, heated to 60° C. at a rate of 10° C. per minute with weight measured to determine "initial weight loss" that should be less than 1% of original weight, and the sample is then maintained at 60° C. for two hours to determine a "percentage weight loss per hour" that should be less than 0.15% per hour. In addition, the out-gassing material, as tested by gas chromatography-mass selective detector ("GC/MSD" such as a Hewlett-Packard HP 5890 GC and HP 5970 MSD) should not be an adhesive material and the retention time of detected material should be less than 12 minutes. In one such embodiment, adhesive film 434 is a dry film, tack free, supplied on a release liner; with a suitable form and spacing of the parts on the liner; and the liner shall not have excessive levels of silicone that transfer to the adhesive film. The bond strength of the adhesive to be a minimum of approximately 25 inch-ounces (0.18 N-m) torque, after adhesive-activation processing at typical conditions of 20–70 seconds at 110°–150° C. at 20–100 psi (140–690 kN/m$^2$) pressure. The final thickness of the adhesive film 434 is approximately 2.6 mils (0.066 mm) after this adhesive-activation processing.

In one such embodiment, to facilitate rework, the adhesive bond separation, by peel or cleavage, of the head-suspension assembly is by adhesive failure to the aluminum surface of the actuator arm. If adhesive remains on the aluminum arm, the adhesive must be removable by a process not damaging to the actuator arm. In one embodiment, the shelf life of the adhesive film 434 is one year at 85° C. maximum storage temperature in sealed packaging. To prevent contamination within the disk drive, the conductive material of adhesive film 434 should not have free or potentially loose particles.

In one such embodiment, the electrical conductivity through the thickness of the material after adhesive-activation processing is approximately 20 ohms maximum at the plus-3-Sigma limit as measured with a resistivity meter with probes for contacts (e.g., from a metal surface of actuator arm 310 to a metal surface of suspension 320).

In one embodiment, an engineering screening test for adhesive film 434 is performed as follows:

(1) Place samples in contact with test surfaces in loosely covered petri dishes such as Falcon 1029 from Beckon Dickenson. Test surfaces are "lubed" and "sputtered" aluminum-and-glass disks, 99.9%+copper foil and glass slides.

(2) When exposed to non-condensing conditions of 96±4 hours at 60±3° C. and 80±5% relative humidity, adhesive film 434 and/or conductive adhesive 435 in the assupplied uncured state shall not stain or haze copper (99.9%), lubed sputtered Al Komag or lubed sputtered glass disks.

(3) Examine disks under bright light such as a 35-mm slide projector and ambient light. Examine copper under ambient light.

(4) Perform the above tests on DI-water-washed glass slides, 75×25×1 mm or equivalent (Baxter Diagnostics M6157) with the adhesive in direct contact with the glass slide. Any fogging, out-gassing condensation or adhesive material transfer to the test surfaces is failure of the tests.

Figure 4C:
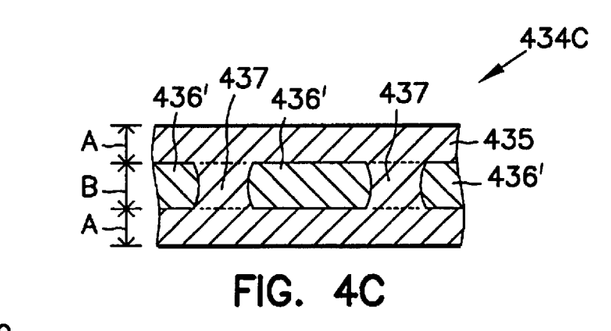
FIG. 4C is an enlarged cross-section view of an adhesive film 434 having a perforated plastic film 436' and an electrically-conductive path from top to bottom.

Another aspect of this invention is the use of heat-activated non-liquid thermosetting adhesive 435 in adhesive film 434. (Any discussion herein of adhesive film 434 includes the specific embodiment adhesive films 434B, 434C, or 434D as described below). In one such embodiment shown in FIG. 4B, adhesive film 434B includes adhesive 435 (for example, A=0.8 mils (0.02 mm) thick, each side) that is applied to both sides of a thin (for example, B=1.0 mil (0.025 mm) thick) support layer of polyamide plastic film 436 to aid in handling and application. (A thin adhesive film without the supporting plastic layer just described can be quite difficult to handle, even with tweezers.) In one such embodiment, the adhesive is electrically conductive to provide an electrical conductive path between the actuator arm 310 and the head-suspension assembly 320. In one embodiment shown in FIG. 4C, adhesive film 434C includes plastic film 436' separating the two layers of electrically-conductive adhesive that is perforated with holes 437, allowing the two layers of adhesive 435 to be in contact with each other, and forming part of an electrically-conductive path from the suspension 320 to the actuator arm 310.

Figure 4D:
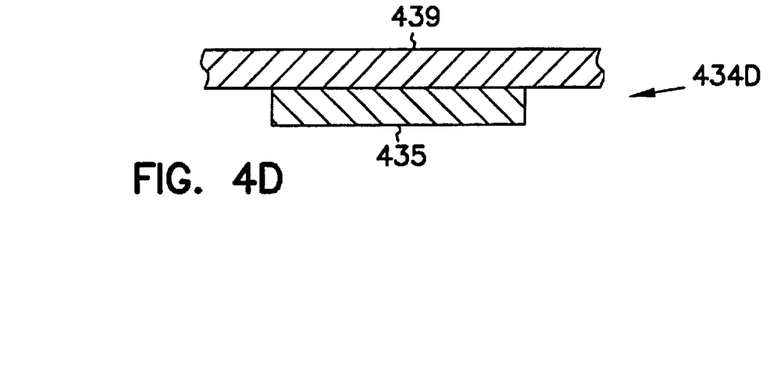
FIG. 4D is an enlarged cross-section view of an adhesive film 434 that is a single homogeneous layer of adhesive supplied on a removable plastic backing 439.

In another embodiment shown in FIG. 4D, adhesive film 434D is a single homogeneous layer of adhesive 435, which is supplied on a removable plastic backing 439. In one such embodiment, adhesive film 434D is electrically conductive. In another such embodiment, each piece of adhesive film 434D is ring-shaped. In one embodiment, removable plastic backing 439 is a long continuous tape supplied as a roll, with die-cut pieces of adhesive film 434 temporarily attached thereto. In one such embodiment, removable plastic backing 439 is resistant to melting and other degradation at high temperatures (i.e., those temperatures needed to activate adhesion in adhesive film 434), to facilitate attachment of the die-cut pieces of adhesive film 434 to one of the pieces to be fastened (e.g., to suspension 320), by heat and pressure applied, e.g., to removable plastic backing 439 and suspension 320. Removable plastic backing 439 is then peeled away, leaving the die-cut adhesive film adhered to suspension 320. Later, suspension 320 is fastened to actuator arm 310 with adhesive film 434 therebetween by application of additional heat and pressure. This method has the additional advantage of fastening adhesive 434 more securely to suspension 320 than to actuator arm 310, which facilitates removal of the adhesive for rework.

Figure 5:
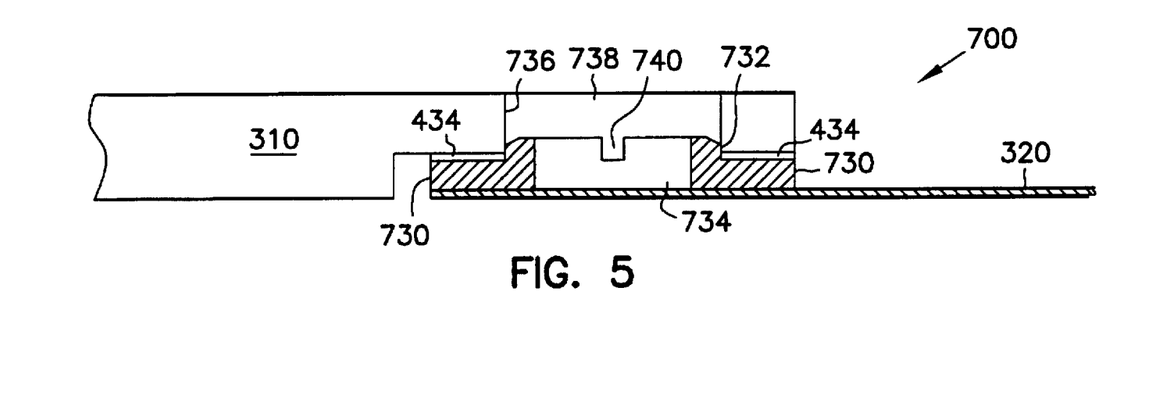
FIG. 5 is a side view showing a grounding means of a head-suspension attached to an actuator arm using a raised boss on the nut plate.
Figure 6:
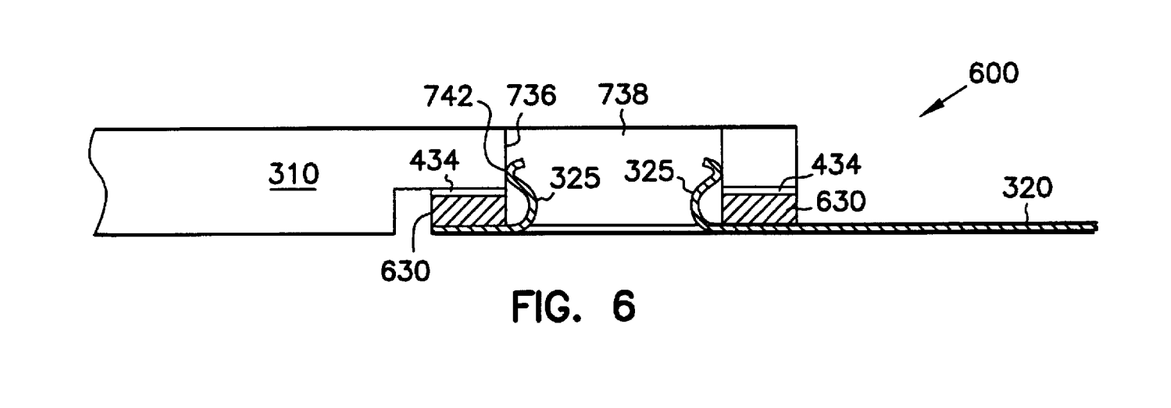
FIG. 6 is a side view showing a grounding means of a head-suspension attached to an actuator arm using grounding tabs formed in the head-suspension material.

FIGS. 5 and 6 show two embodiments (head-arm assemblies 700 and 600, respectively) of this invention that achieve electrical continuity between the head-suspension assembly 320 and the actuator arm assembly 310. In FIG. 5, electrical continuity is achieved by constructing the nut plate 730 with a raised boss 734, such that the surface of the boss 732 makes electrical contact with the inside surface 736 of a hole 738 bored in the actuator arm 310. Another embodiment uses one or more splits 740 made in the raised boss 734. As the raised boss 734 with the split(s) 740 is forced into the hole 738, portions of the raised boss 734 flex toward the center of the raised boss 734, resulting in a secure electrical connection between the actuator arm 310 and the head-suspension 320.

FIG. 6 shows one embodiment having one or more grounding tabs 325 formed in the head-suspension 320 material. As shown in FIG. 6, the grounding tab(s) 325 contact the inside surface 736 at point 742 of hole 738 bored into the actuator arm 310. In another embodiment, grounding is accomplished by one or more tabs 325, as seen in FIG. 7A. The tab(s) 325 contact the recessed surface 744 at point 746 on the actuator arm 310. In the embodiment shown in FIG. 7A, hole 748 is made in nut plate 630 allowing tab(s) 325 to pass through the nut plate 630. In another embodiment, grounding is accomplished by one or more tabs 325 that extend beyond the edge of nut plate 430, as shown in side view FIG. 7B of the assembled. FIG. 7C is a side view, FIG. 7D is a partial end view, and FIG. 7E is a partial top view, each view showing nutplate 430 as attached to suspension 320 before assembly to arm 310.

Figure 7F:
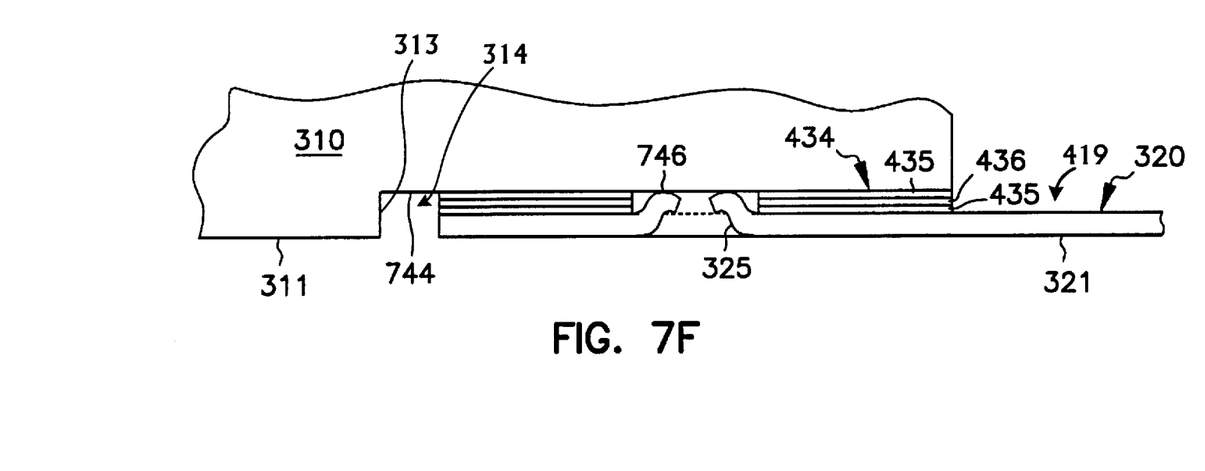
FIG. 7F is a side view showing a grounding means of a head-suspension 320 attached to an actuator arm 310 without a nut plate, but having grounding tabs formed in the head-suspension material.

FIG. 7F is a side view showing a grounding means for a head-suspension 320 attached to an actuator arm 310 without a nut plate, but having grounding tabs formed in the head-suspension material. In the embodiment shown in FIG. 7F, a hole is punched in the adhesive film 434 through which formed tabs 325 of the suspension material make electrically-conductive contact at point 746.

Figure 7G:
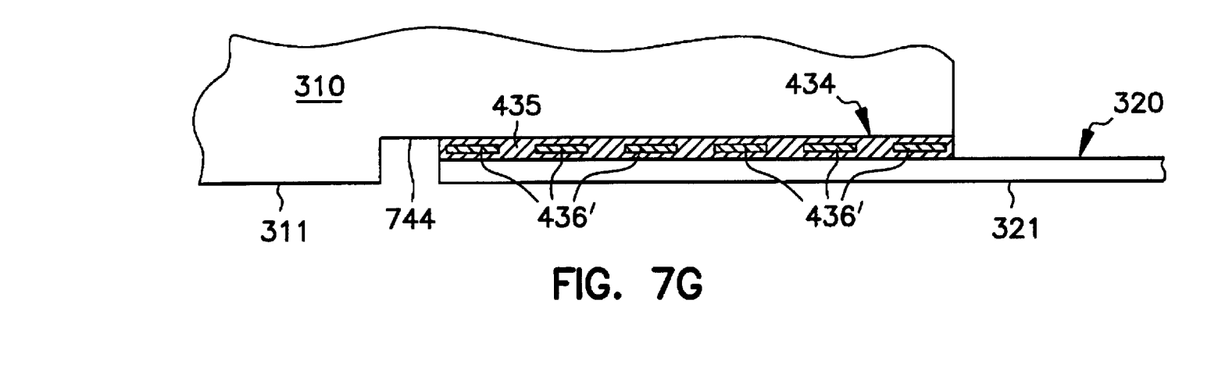
FIG. 7G is a side view showing a grounding means of a head-suspension 320 attached to an actuator arm 310 using conductive adhesive 435 that makes contact through perforations in support layer 436.

FIG. 7G is a side view showing a grounding means for a head-suspension 320 attached to an actuator arm 310 using adhesive film 434 having conductive adhesive 435 that conducts electricity (between arm 310 at recessed surface 744 and suspension 320) through perforations in support layer 436.

Figure 8:
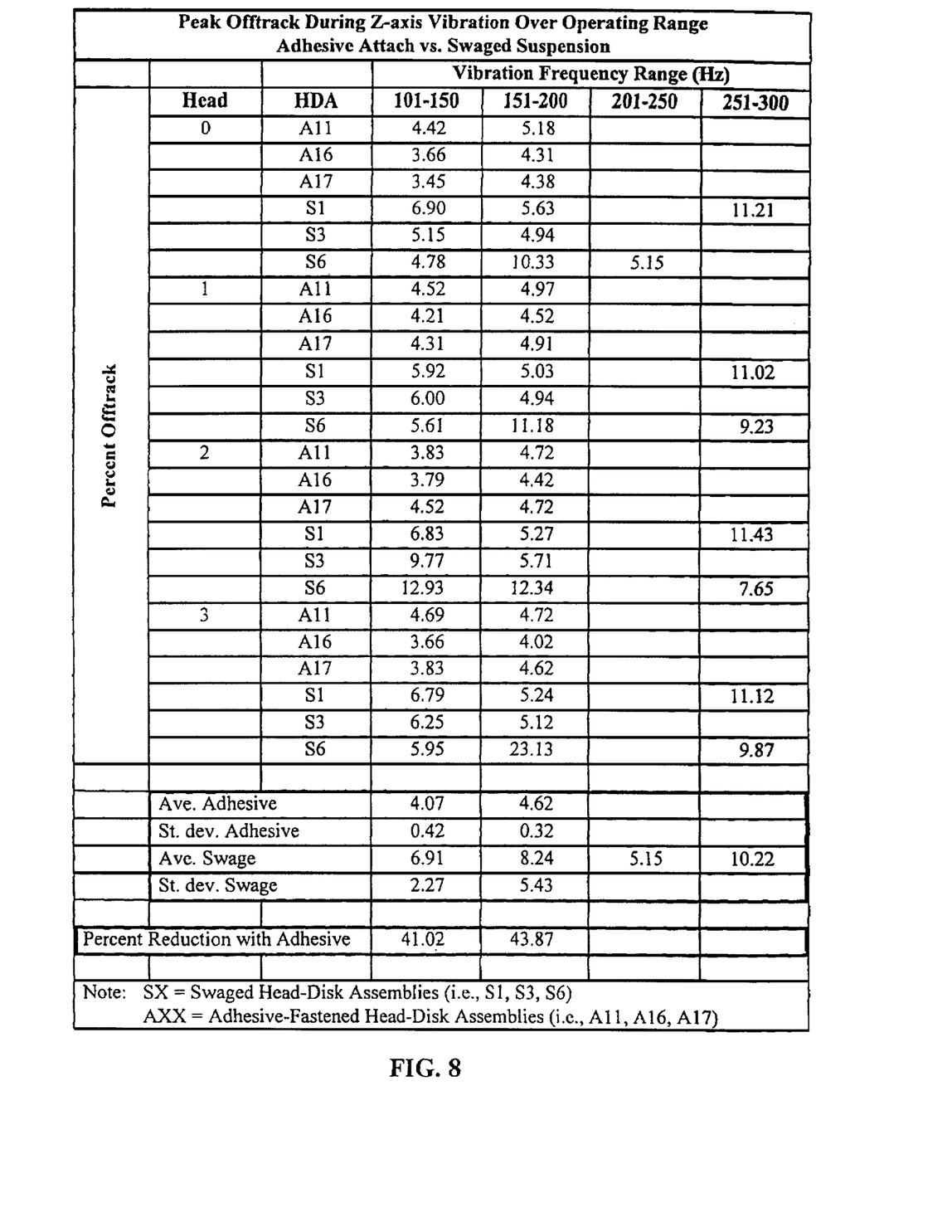
FIG. 8 is a table showing the improvement in peak offtrack error performance in one experiment by using adhesive-attached suspensions over that obtained using swaged-attached suspensions.

FIG. 8 is a table showing the improvement in peak offtrack error performance in one experiment conducted to compare the performance of using adhesive-attached suspensions of this invention to that obtained using swaged-attached suspensions. The percent of offtrack errors is measured as the drive is vibrated at various frequencies in the Z-direction (perpendicular to the disk surface 141). Data is shown for each of four heads (heads 0, 1, 2, and 3) in each of three adhesivefastened drives of this invention (A11, A16, and A17) and each of three swage-fastened drives of the prior art (S1, S3, and S6). Off-track percentages were reduced by 41% to 43% in the disk drives of this invention with the adhesive-attached suspensions of this invention.

The shock improvement realized by moving the nutplate away from the disk is directly related to the increased spacing between the suspension attachment means and the disk surface. In a shock event, both the disk 140 and the arm 310 deflect (but not always in the same direction at the same time) and thus close the gap between the nutplate (that is at the arm tip) and the disk surface 141. In one typical arrangement, the gap 144 starts out at approximately 0.008 inches. With tolerance "stack-up", the gap can be negative (interference condition) under worst case assumptions. The stack-up of tolerances is usually analyzed statistically. In this case, the statistical tolerance stack-up was 8±8 mils (0.2±0.2 mm), leaving no reliable clearance to handle the movement of Ii components resulting from a shock event. By moving the nutplate next to the actuator arm according to this invention, the nominal clearance in this embodiment increased to 20 mils (0.51 mm), an advantageous increase.

Using this invention, the nut plate position can be reversed while maintaining the 9.8 mils (0.25 mm) nutplate thickness, but the suspension attachment technique must be changed. One possibility is to employ a design incorporating interlocking suspensions, wherein two nutplate ferrules (bosses) that occupy the same arm have different diameters so that one boss fits inside of the opposing boss. If rework of one is required, both must be removed. Also, additional parts are needed for the outer arms where only one suspension is used. This approach is rejected as too expensive.

This is where the adhesive attachment method of this invention comes in. The nutplate ferrule acts only as a position locator and therefore can be very short. This allows opposing bosses to have the same diameters and fit into a thin arm. As mentioned before, the adhesive attach allows one embodiment to eliminate the nutplate altogether. This has shock benefit. With less mass at the arm tip, one also gets less deflection during a shock event. Since less mass also results in less inertia, there is an improvement in seek-time performance as well.

"Torque-out" refers to the amount of torque the suspension attachment joint can support before the suspension rotates in the actuator "swage hole," which is one measure of the strength of the attachment. The test is typically performed by applying a load to the suspension at a fixed distance from the attachment hole. The load is increased until it is noted that the suspension has rotated relative to the actuator arm. In a portable drive, the shock performance requirement causes one to consider the integrity of this attachment. The shock loading applies a torque that needs to be resisted. The consistency and relatively high torque-out capability of the adhesive attachment in comparison to swage attachment is one major advantage of the adhesive attachment of this invention.

Another aspect of this invention is the use of a heat-activated and/or non-liquid adhesive to attach the head/slider assembly 950 to the suspension 320, as shown in FIGS. 9A and 9B. In one embodiment, a conductive adhesive film 934 similar in construction to adhesive films 434B, 434C or 434D is used for head-to-suspension bonding. In one such embodiment, adhesive film 934 is approximately one-half as thick as adhesive film 434. In the embodiment shown in FIG. 9A, electrically-conductive adhesive 434 is used to bond suspension 320 to actuator arm 310, and electrically-conductive adhesive 934 is used to bond suspension 320 to head assembly 950. In the embodiment shown in FIG. 9B, electrically-conductive spring tabs 325 in both ends of suspension 320 provide electrical connections to actuator arm 310 and head assembly 950, and adhesive 434 (not necessarily electrically conductive) is used to bond suspension 320 to actuator arm 310, and adhesive 934 (not necessarily electrically conductive) is used to bond suspension 320 to head assembly 950. It is to be realized that FIGS. 9A and 9B are meant to illustrate a head assembly-to-suspension construction, and that combinations with other fastening schemes for the opposite end of suspension 320 are also possible.

In one embodiment, the conductive-adhesive-film method is used to bond the head to the suspension using a single adhesive. In one embodiment, the adhesive film is die cut to the needed shape and supplied on a carrier film. One method used transfers, or pre-applies, the die cut adhesive to either the suspension or the head by pressing under minimal heat and pressure (i.e., enough heat and pressure to get the adhesive film to stick to the suspension—or to the head, as the case may be) through the carrier film. Typical transfer conditions would be approximately 180°–225° F. (82°–107° C.) for 5–15 seconds, enough to transfer the adhesive film without curing the adhesive film past the functional adhesion limit. The process is completed by assembling and processing the head/adhesive/suspension under heat and pressure similar to that used in the suspension-to-actuator assembly described above. In one embodiment, adhesive film 934 is thinner than adhesive film 434. In one such embodiment, adhesive film 934 is 0.5 mil (0.013 mm).

The advantages of the head-to-suspension adhesive film method include the following:

(1) The process is simplified by applying one adhesive instead of two.

(2) The process is shortened by elimination of the UV and tunnel heat ovens.

(3) The result is improved by the improved ability to control the thickness, placement, and shape of adhesive, resulting in higher dimensional control in the X, Y and Z axis.

(4) The assembly can be more easily reworked.

In one such embodiment, a circular ring of adhesive film 434 is sandwiched between a release layer and the suspension 320 with pressure and heat. The circular ring shape of adhesive film 434 in this embodiment provides a symmetric shape to avoid misalignment problems that can arise if other shapes are used, and the hole in the center provides a feature that can be aligned over a corresponding feature of the part being adhered, in this case suspension 320. In one embodiment, formed conductivity fingers of suspension 320 extend through the hole in the circular ring of adhesive film 434, to electrically contact actuator arm 310 when assembled, the surrounding circular ring of adhesive film 434 providing even force on the fingers to maintain this contact. The release layer is then removed from its surface of adhesive film 434, and that surface is placed on actuator arm 310 with additional heat and pressure applied. The total heat and pressure activation on the suspension 320 surface exceeds that for the actuator arm side, providing preferential adhesion to the suspension 320. In another embodiment, the preferential adhesion is based on a temperature differential between the surfaces as they are bonded or separated. In yet another embodiment, the preferential adhesion is based on a difference in adhesive-layer characteristics on one face (i.e., on one side) of the adhesive film relative to that of the other face. In yet another embodiment, the surface energies and/or surface roughness of the materials to be bonded (i.e., the suspension and the actuator arm, respectively) are chosen to achieve preferential adhesion.

It has been demonstrated that the use of the head-arm assembly 400 enhances the performance and/or error-resistance of the disk drive. It is thought that this performance improvement is due, at least in part, to the synthetic-rubber adhesive providing a better vibration damping effect than can be achieved with direct metal-to-metal fastening for the vibrations of the head-arm assembly 400, thereby reducing the number of off-track read errors.

It is understood that the above description is intended to be illustrative, and not restrictive. Many other embodiments will be apparent to those of skill in the art upon reviewing the above description, for example, the use of epoxy in place of the adhesive film 434. The scope of the invention should, therefore, be determined with reference to the appended claims, along with the full scope of equivalents to which such claims are entitled.

TABLE A-1

BRADY L1656-54
DOUBLE-SIDE THERMOSET ADHESIVE

ELECTRICAL PROPERTIES

| | |
|---|---|
| Dielectric Strength ASTM D149-93a | 3190 volts/mil |
| Surface Resistivity ASTM D257-93 | >2.2 × $10^{16}$ ohms/square |
| Volume Resistivity ASTM D257-93 | 1.5 × $10^{15}$ ohm-cm |
| Dielectric Constant ASTM D150-92 | 3.72 at 1 kilohertz 3.80 at 1 megahertz |
| Dissipation Factor ASTM D150-92 | 0.0072 at 1 kilohertz |

ADHESIVE MODULUS OF ELASTICITY

Modulus determined on unsupported adhesive film in tension

| | |
|---|---|
| Uncured (as received) | 6,000 psi (4.1 × $10^8$ dynes/cm$^2$) |
| Full cure | 75,000 psi (5.2 × $10^9$ dynes/cm$^2$) |

COEFFICIENT OF THERMAL EXPANSION

C.T.E. was determined by Thermomechanical Analysis at 10° C./minute.

| | |
|---|---|
| "Z" direction C.T.E. | 25 × $10^{-5}$/°C. |

HEAT DISSIPATION

| | |
|---|---|
| "K" factor (at 45° C.) | 1.7 × $10^4$ cal/cm-sec °K. 0.70 watts/cm °K. |

TABLE A-2

BRADY L1766-80
THERMOSET ADHESIVE FILM

DESCRIPTION

L1766-80 is a film tape made from a thermosetting synthetic rubber heat seal adhesive and supplied either as an unsupported free film, or with a polyamide film support layer. It is available in thicknesses of 20 microns (0.0008") and 40 microns (0.0016") as a tree film. Other thicknesses TABLE A-2-continued

BRADY L1766-80
THERMOSET ADHESIVE FILM are available upon request.

USE

L1766-80 has high adhesion on initial tacking with heat. The adhesion continues to build as the adhesive goes through thermosetting with further heat exposure.

DIMENSIONS

The adhesive can be supplied in roll form, slit to precise width and wound in 100 yard (91.3 meter) lengths. Special die cut configurations are also available. Contact Brady with your die cut component needs.

RECOMMENDED TAPING CONDITIONS

Taping equipment varies in design, so the specific parameters used will depend on machine type as well as the capability of the instrumentation. Pressure should be kept to the lowest practical level (30–50 psi). Dwell time for initial attach can be as low as 0.2 to 0.5 seconds to preheated surfaces. Initial tack can be obtained in the 120° C. to 170° C. range depending on thermal transfer characteristics of the materials being laminated. Longer dwell time will give a harder adhesive for applications requiring this property. Curing can take place in a separate step, depending on the application. This can take place in one hour at 170° C., or for longer times at lower temperatures.

ADHESION

Adhesion levels are dependent on application technique, curing conditions, and the surfaces being bonded. Polyamide film to copper sheet peel adhesion values up to 7 pounds/inch width (1.2 kg/cm width) have been obtained on cured adhesives. Brady can assist in developing recommended conditions for new applications.

TABLE A-3

BRADY L1766-80
THERMOSET ADHESIVE FILM

ELECTRICAL PROPERTIES

| | |
|---|---|
| Dielectric Strength ASTM D149-93a | 2820 volts/mil |
| Surface Resistivity ASTM D257-93 | >2.2 × $10^{16}$ ohms/square |
| Volume Resistivity ASTM D257-93 | 8.3 × $10^{13}$ ohm-cm |
| Dielectric Constant ASTM D150-92 | 4.06 at 1 kilohertz 4.12 at 1 megahertz |
| Dissipation Factor ASTM D150-92 | 0.0082 at 1 kilohertz 0.0082 at 1 megahertz |

ADHESIVE MODULUS OF ELASTICITY

Modulus determined on unsupported adhesive film in tension

| | |
|---|---|
| Uncured (as received) | 6,000 psi (4.1 × $10^8$ dynes/cm$^2$) |
| Full cure | 75,000 psi (5.2 × $10^9$ dynes/cm$^2$) |

COEFFICIENT OF THERMAL EXPANSION

C.T.E. was determined by Thermomechanical Analysis at 10° C./minute.

| | |
|---|---|
| "Z" direction C.T.E. | 60 × $10^{-5}$/°C. |

HEAT DISSIPATION

| | |
|---|---|
| "K" factor (at 45° C.) | 1.7 × $10^4$ cal/cm-sec °K. 0.24 watts/cm °K. |

TABLE A-4

BRADY L1766-80
THERMOSET ADHESIVE FILM

IONIC PURITY

Water soluble ionic contamination is measured by analysis of the extract of the tape under the following conditions.

TABLE A-4-continued

BRADY L1766-80
THERMOSET ADHESIVE FILM 10 grams of tape (cured 1 hour at 200° C.) is extracted into 100 grams of deionized water at 121° C. for 20 hours at 2 atmospheres of pressure. Typical results follow:

| ION | ppm | ION | ppm |
| --- | --- | --- | --- |
| Sodium | 0.8 | Chloride | 0.5 |
| Potassium | 0.1 | Fluoride | 0.1 |
| Calcium | 0.6 | Nitrate | 0.2 |
| Magnesium | 0.1 | Nitrite | 0.2 |
| Aluminum | 0.05 | Phosphate | 0.2 |
| Copper | 0.01 | Sulfate | 3.8 |
| Iron | 0.02 | Sulfide | 0.1 |
| CONDUCTIVITY | 74 micromhos/cm | | |

STORAGE LIFE 1 year when stored at less than 30° C. (86° F.) in the original packaging.

We claim:

1. A head stack assembly for a disk drive, the disk drive including a disk having a recording surface, the head stack assembly comprising:

an actuator arm including:
   a first surface parallel to the recording surface;
   a second surface adjacent to the first surface;
   a third surface parallel to the first surface and spaced-apart from the first surface in
   a direction perpendicular to the recording surface;
the second surface and the third surface defining a recess; and
a head suspension assembly connected to the third surface;
the head suspension assembly including:
   a head suspension including:
      a mounting surface facing away from the recording surface;
      a disk facing surface facing towards the recording surface; and
   a nut plate abutting the mounting surfaces;
   an adhesive film positioned between the nutolate and the third surface;
   the nutplate and the adhesive film positioned in the recess such that the disk facing surface is substantially co-planar with the first surface.

2. The head stack assembly of claim 1 wherein the adhesive film includes:
   a pair of thermosetting dry films; and
   a plastic film positioned between each thermosetting dry film.

3. The head stack assembly of claim 1 wherein the adhesive film includes:
   an electrically conductive adhesive; and
   a plastic film embedded in the conductive adhesive, the plastic film having a plurality of holes.

4. The head stack assembly of claim 1 wherein the head suspension further includes:
   a grounding tab abutting the actuator arm.

5. The head stack assembly of claim 4 wherein the grounding tab forms a unitary structure with the head suspension and abuts the third surface.

6. A head stack assembly for a disk drive, the disk drive including a disk having a recording surface, the head stack assembly comprising:

an actuator arm including:
   a first surface parallel to the recording surface;
   a second surface adjacent to the first surface;
   a third surface parallel to the first surface and spaced-apart from the first surface in
   a direction perpendicular to the recording surface;
the second surface and the third surface defining a recess; and
a head suspension assembly connected to the third surface;
the head suspension assembly including:
   a head suspension including:
      a mounting surface facing away from the recording surface;
      a disk facing surface facing towards the recording surface;
   a solid adhesive film having a hole, the adhesive film positioned between the mounting surface and the third surface and positioned in the recess such that the adhesive film abuts the third surface and the disk facing surface is substantially co-planar with the first surface.

7. The head stack assembly of claim 6 wherein the adhesive film includes:
   a plurality of holes;
   an electrically conductive adhesive; and
   a plastic film embedded in the conductive adhesive, the plastic film having spaced-apart portions defining the plurality of holes.

8. The head stack assembly of claim 6 wherein the head suspension further includes:
   an electrically conductive contact extending through the hole such that the contact abuts the third surface.

9. A disk drive comprising:
a disk having a recording surface; and
a head stack assembly including:
   an actuator arm including:
      a first surface parallel to the recording surface;
      a second surface adjacent to the first surface;
      a third surface parallel to the first surface and spaced-apart from the first surface in a direction perpendicular to the recording surface;
   the second surface and the third surface defining a recess; and
   a head suspension assembly connected to the third surface;
   the head suspension assembly including:
      a head suspension including:
         a mounting surface facing away from the recording surface;
         a disk facing surface facing towards the recording surface; and
      a nut plate abutting the mounting surface;
      an adhesive film positioned between the nutplate and the third surface;
      the nutplate and the adhesive film positioned in the recess such that the disk facing surface is substantially co-planar with the first surface.

10. The disk drive of claim 9 wherein the adhesive film includes:
    a pair of thermosetting dry films; and
    a plastic film positioned between each thermosetting dry film.

11. The disk drive of claim 9 wherein the adhesive film includes:
    an electrically conductive adhesive; and
    a plastic film embedded in the conductive adhesive, the plastic film having a plurality of holes.

12. The disk drive of claim 9 wherein the head suspension further includes:

a grounding tab abutting the actuator arm.

13. The disk drive of claim 12 wherein the grounding tab forms a unitary structure with the head suspension and abuts the third surface.

14. A disk drive comprising:

a disk having a recording surface; and a head stack assembly including:

an actuator arm including:

a first surface parallel to the recording surface;

a second surface adjacent to the first surface;

a third surface parallel to the first surface and spaced-apart from the first surface in a direction perpendicular to the recording surface;

the second surface and the third surface defining a recess; and a head suspension assembly connected to the third surface;

the head suspension assembly including:

a head suspension including:

a mounting surface facing away from the recording surface;

a disk facing surface facing towards the recording surface;

a solid adhesive film having a hole, the adhesive film positioned between the mounting surface and the third surface and positioned in the recess such that the adhesive film abuts the third surface and the disk facing surface is substantially co-planar with the first surface.

15. The disk drive of claim 14 wherein the adhesive film includes:

a plurality of holes;

an electrically conductive adhesive; and a plastic film embedded in the conductive adhesive, the plastic film having spaced-apart portions defining the plurality of holes.

16. The disk drive of claim 14 wherein the head suspension further includes:

an electrically conductive contact extending through the hole such that the contact abuts the third surface.

* * * * *